United States Patent
Nakata et al.

(10) Patent No.: US 7,417,211 B2
(45) Date of Patent: Aug. 26, 2008

(54) LASER SCANNING MICROSCOPE HAVING A MECHANISM WHICH PREVENTS STIMULATION LIGHT FROM REACHING A LIGHT DETECTOR

(75) Inventors: Tatsuo Nakata, Hino (JP); Masahiro Oba, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/252,564

(22) Filed: Oct. 18, 2005

(65) Prior Publication Data

US 2006/0086887 A1    Apr. 27, 2006

(30) Foreign Application Priority Data

Oct. 21, 2004   (JP)   ............................. 2004-306908

(51) Int. Cl.
- G02B 7/04    (2006.01)
- G02B 21/00   (2006.01)
- F21V 9/16    (2006.01)

(52) U.S. Cl. .................. 250/201.3; 250/458.1; 359/368

(58) Field of Classification Search .............. 250/201.3, 250/458.1; 359/368
See application file for complete search history.

(56) References Cited

U.S. PATENT DOCUMENTS

| | | | | |
|---|---|---|---|---|
| 5,142,132 A | * | 8/1992 | MacDonald et al. | ..... 250/201.9 |
| 5,682,038 A | * | 10/1997 | Hoffman | .................. 250/458.1 |
| 6,094,300 A | | 7/2000 | Kashima et al. | |
| 2001/0045529 A1 | * | 11/2001 | Iketaki et al. | ............ 250/493.1 |
| 2002/0176076 A1 | * | 11/2002 | Bouzid et al. | ................ 356/318 |
| 2003/0029995 A1 | * | 2/2003 | Mullins et al. | ............... 250/302 |

FOREIGN PATENT DOCUMENTS

JP    2000-275529 A    10/2000

* cited by examiner

*Primary Examiner*—Thanh X Luu
(74) *Attorney, Agent, or Firm*—Frishauf, Holtz, Goodman & Chick, P.C.

(57) ABSTRACT

A laser scanning microscope which focuses light beams from a laser beam source to a sample by means of an objective lens and detects transmission light from the sample, reflection light, or fluorescence generated from the sample, includes an observation laser scanning optical system which irradiates coherent light from one side of the sample and which carries out scanning the sample, a stimulation laser scanning optical system which irradiates coherent light from an opposite side across the sample and which carries out scanning the sample, an observation light detector provided to be branched from the observation laser scanning optical system, and a light invasion preventing section which prevents the coherent light irradiated from the stimulation laser scanning optical system from invading the observation light detector.

3 Claims, 13 Drawing Sheets

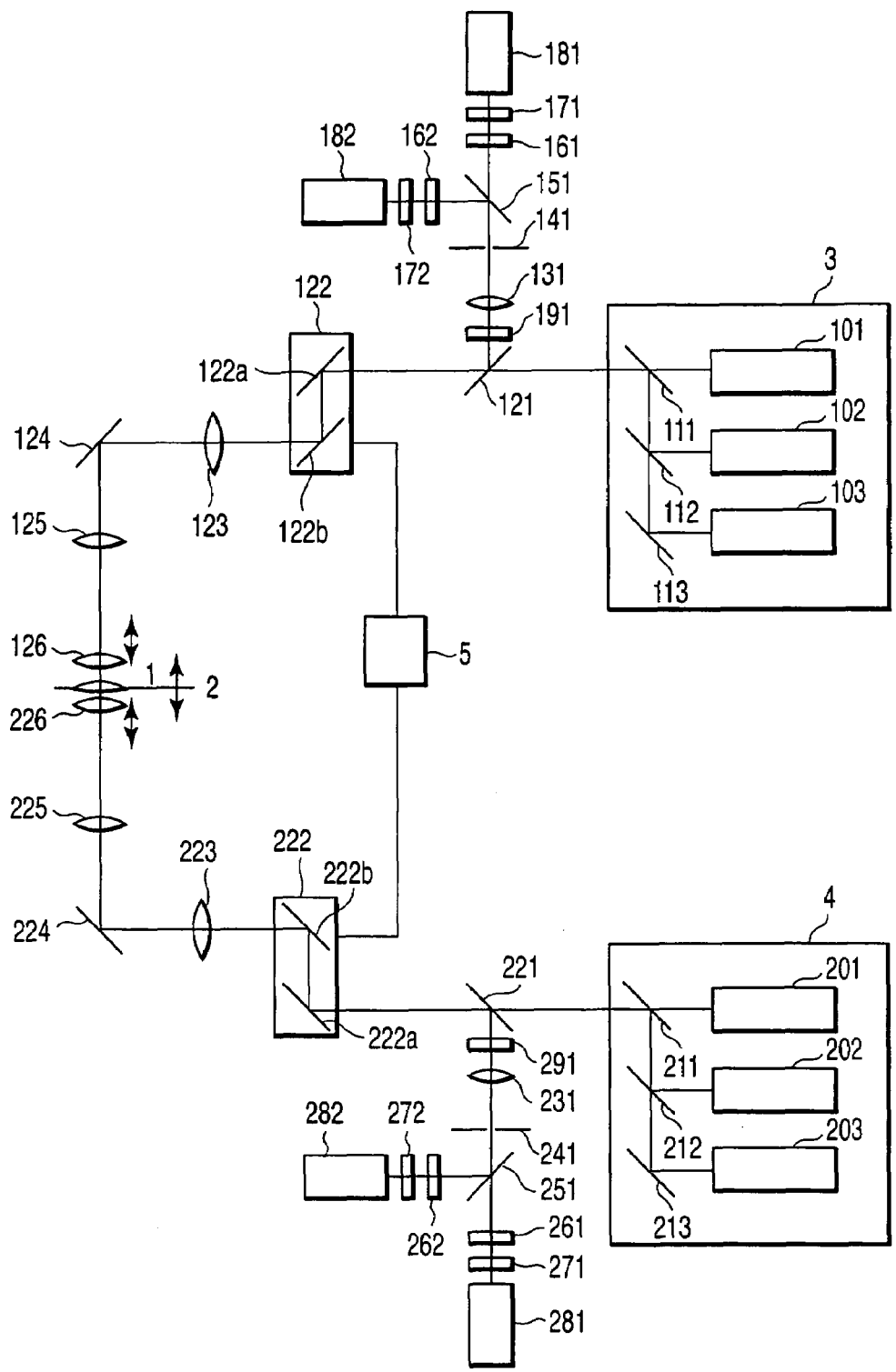
F I G. 1

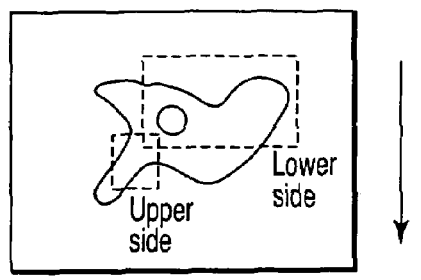
FIG. 7
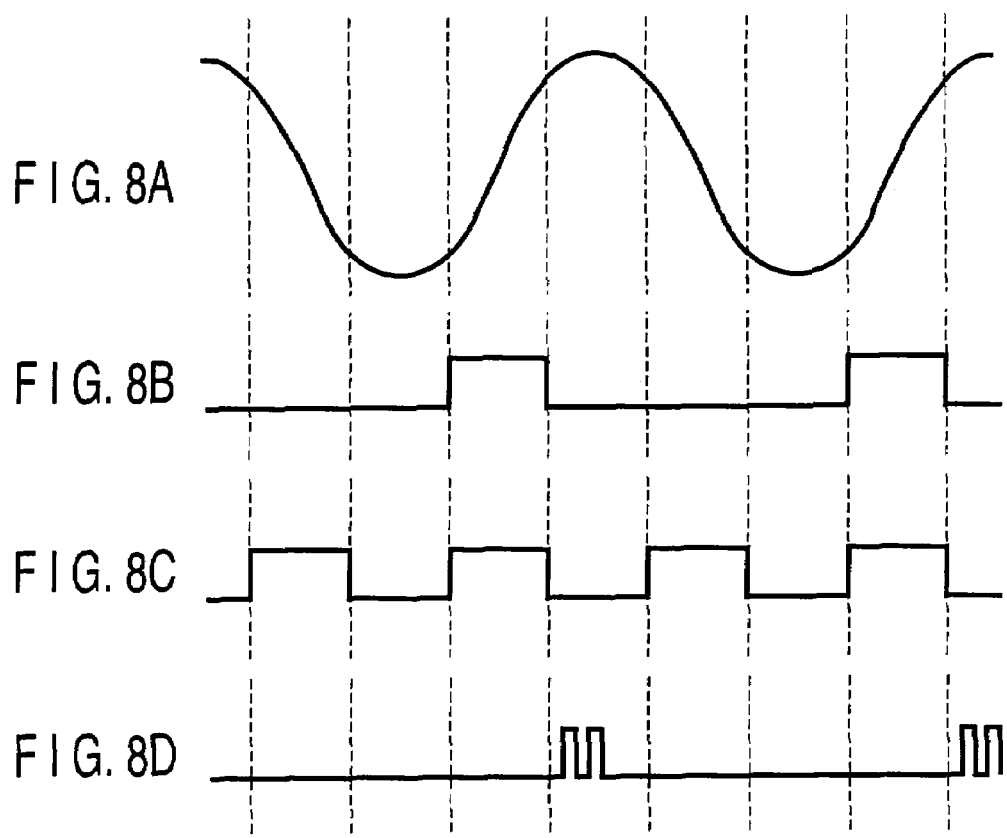
FIG. 8A
FIG. 8B
FIG. 8C
FIG. 8D
FIG. 9

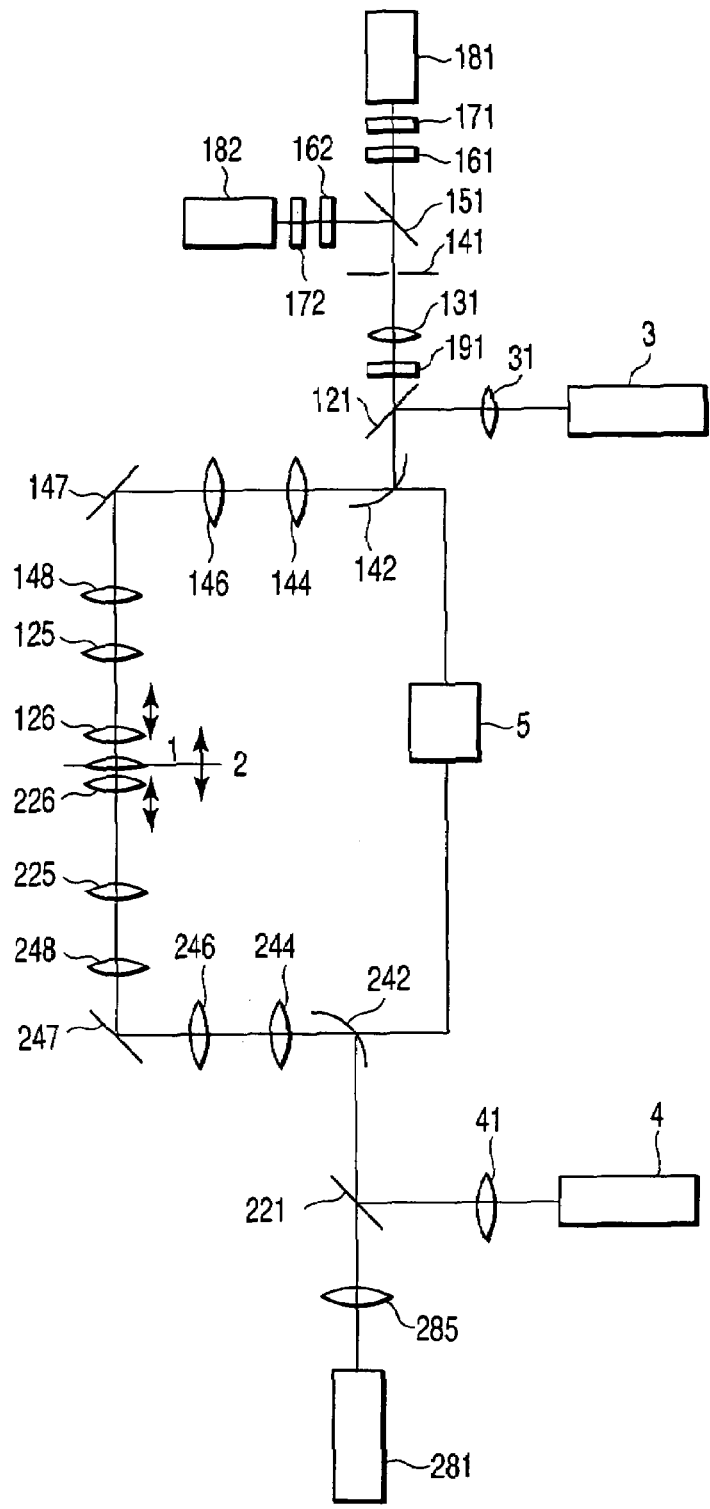
F I G. 10

LASER SCANNING MICROSCOPE HAVING A MECHANISM WHICH PREVENTS STIMULATION LIGHT FROM REACHING A LIGHT DETECTOR

CROSS-REFERENCE TO RELATED APPLICATIONS

This application is based upon and claims the benefit of priority from prior Japanese Patent Application No. 2004-306908, filed Oct. 21, 2004, the entire contents of which are incorporated herein by reference.

BACKGROUND OF THE INVENTION

1. Field of the Invention

The present invention relates to a laser scanning microscope for detecting transmission-light and/or reflected light from a sample or fluorescence generated from the sample when a sample has been scanned with coherent light outputted from a laser beam source.

2. Description of the Related Art

A laser scanning microscope is used for observation of a variety of samples. For example, in the case where a biological sample is observed, fluorescence observation is often carried out by applying a fluorescence dye to the sample. In a general laser microscope, fluorescence light is very weak, and thus, it is a routine to insert a laser cutting filter for cutting laser beam for fluorescence excitation or a filter having wavelength characteristics in which laser cutting can be carried out for a fluorescence band pass filter. This laser cutting filter requires a characteristic of OD (optical density) of 4 or more in the practical point of view.

In addition, in U.S. Pat. No. 6,094,300, there is disclosed a laser microscope (hereinafter, may be referred to as a "above and below" microscope) in which laser scanning optical systems have been disposed at the both of upper side and lower side of a sample.

BRIEF SUMMARY OF THE INVENTION

A laser scanning microscope which focuses light beams from a laser beam source onto a sample surface by means of an objective lens and detects transmission light from the sample, reflection light, or fluorescence generated from the sample, according to an aspect of the present invention is characterized by comprising: an observation laser scanning optical system which irradiates coherent light and which carries out scanning the sample; a stimulation laser scanning optical system which irradiates coherent light and which carries out scanning the sample; an observation light detector provided to be branched from the observation laser scanning optical system; and a light invasion preventing section which prevents the coherent light irradiated from the stimulation laser scanning optical system from invading the observation light detector.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration of a laser scanning microscope according to a first embodiment of the present invention;

FIGS. 4A to 4C are views each showing a configuration of a laser scanning microscope according to a second embodiment of the present invention;

FIG. 7 is a view adopted to explain a method for cutting laser beam in the case where no laser beam cutting mechanism according to an optical element is provided;

FIGS. 8A to 8D are views each showing an example of an operation according to a sixth embodiment of the present invention;

FIG. 9 is a view showing an example of optically moving a focal point;

FIG. 10 is a view showing an example of changing a focal position by means of a deformable mirror;

DETAILED DESCRIPTION OF THE INVENTION

Figure 2:
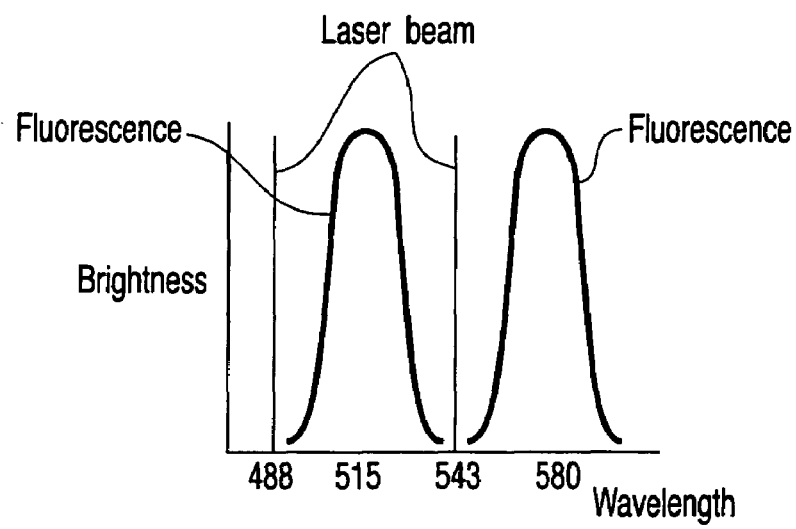
FIG. 2 is a view showing an example of a wavelength distribution of laser beam to be cut.

According to the present invention, when obtaining the image by using the detector provided at one scanning optical system, the influence of the laser beam emitted from the other scanning optical system can be effectively excluded, in the laser microscope which comprises a plurality of laser scanning optical systems which are independently operable for each other (The laser scanning optical system has a couple of galvano scanner for scanning the laser beam in XY direction, for instance).

Recently, sample observation has often been carried out by irradiating an observation laser beam while a laser beam for stimulating a sample is irradiated to impart a stimulus. Such a stimulation laser is often strong in power as compared with an observation laser. For example, in measurement such as FRAP (fluorescent recovery after photobleaching), a laser is irradiated for the purpose of bleaching fluorescence until the fluorescence has been discharged. The laser power at this time is higher than laser power obtained when exciting fluorescence for the purpose of observation. Therefore, to cut a laser beam for stimulation, a higher cutting ability is required to cut the laser beam for stimulation than is required to cut the laser beam for observation. Further, in an above and below microscope, since two scanning optical systems are placed on opposite sides of the sample, the laser beam from one scanning optical system enters directly into the other scanning optical system. Therfore, detecting fluoresence with an above and below microscope requires a higher capability of carrying out laser cutting than is required in a general laser microscope in which a laser scanning system is provided only at one side of the sample. In this case, the observation image can be acquired without the influence of the laser beam for stimulation according to the present invention.

Hereinafter, preferred embodiments of the present invention will be described with reference to the accompanying drawings.

First Embodiment

A first embodiment will be described with reference to FIG. 1. FIG. 1 is a view of a configuration showing a laser scanning microscope according to the first embodiment of the present invention.

In the laser scanning microscope according to the present embodiment, similar laser scanning optical systems are disposed at the upper side and lower side with respect to a sample 1. The upper side and lower side laser scanning optical systems each have a similar configuration. Thus, only the upper side laser scanning optical system will be described in the present embodiment. In the following embodiments as well, only the upper side laser scanning optical system will be described unless otherwise specified.

A laser unit 3 comprises laser beam sources 101 to 103 for outputting laser beam having different wavelengths, dichroic mirrors 111 and 112, and a mirror 113. The laser beam outputted from the laser beam source 101 is outputted from the laser unit 3 through the dichroic mirror 111. The laser beam outputted from the laser beam source 102 is reflected on the dichroic mirrors 112 and 111, and the reflected light is outputted from the laser unit 3. The laser beam outputted from the laser beam source 103 is reflected on the mirror 113, and the reflected light transmits the dichroic mirror 112. The resulting light is reflected on the dichroic mirror 111, and the reflected light is outputted from the laser unit 3. In this manner, the laser beams from the laser beam sources 101 to 103 or any two or three composite light beams thereof are outputted from the laser unit.

The coherent light outputted from the laser unit 3 transmits a dichroic mirror 121, and the resulting light is deflected by means of a scanning optical system 122 having mirrors 122a and 122b for deflecting laser beam in an XY direction. The scanning optical system 122 is controlled by means of a control unit 5. The laser beam deflected by the scanning optical system 122 is made incident to an objective lens 126 via a mirror 124 and an image forming lens 125, and the incident light is focused at a focal position of the sample 1 after a beam diameter has been changed to an pupil diameter of the objective lens 126 by means of an pupil projecting lens 123.

The sample 1 is excited by means of the focused light, and emits fluorescence. This fluorescence travels back along the optical path, and returns to the dichroic mirror 121. The dichroic mirror 121 transmits an excitation wavelength of laser beam, and reflects a fluorescence wavelength, whereby the excitation wavelength and fluorescence wavelength are separated from each other. The fluorescence reflected on the dichroic mirror 121 is incident to a confocal lens 131 via a filter 191, and then, only the light focused at a position conjugated to a focal position of the objective lens 126 at a pin hole 141 transmits therethrough, and the resulting light is guided to a dichroic mirror 151. The dichroic mirror 151 is intended to separate a wavelength of a sample having two-wavelength fluorescence, and the light divided into two wavelength components by this dichroic mirror 151 is inputted to detectors 181 and 182 after the required fluorescence wavelength region has been selected by means of each of filters 161 and 162 and each of filters 171 and 172. In general, complete wavelength separation cannot be carried out by means of the dichroic mirror 121, and some excitation light enters an observation optical path together with fluorescence. Since the intensity of excitation light is much greater than the fluorescence intensity, fluorescence cannot be detected at a high S/N ratio when the fluorescence is merely separated by means of the dichroic mirror. Thus, the filters 161 and 162 and the filters 171 and 172 each having a function for completely interrupting an excitation wavelength and sampling only fluorescence are used. A multi-layer interference filter can be used as those line filters, but, since it is practically difficult for such multi-layer interference filter to provide a transmission rate characteristic having a high OD value over a wide wavelength range as its characteristic, generally used is a filter which has a characteristic such that an OD value of a target wavelength (excitation wavelength in this case) is high and a transmission rate of fluorescence is high. The detectors 181 and 182 each photoelectrically convert incident light. An electrical signal photoelectrically converted by the detectors 181 and 182 each is obtained as digital data by means of an AID converter (not shown), and the obtained digital data is displayed as a confocal image on a monitor on a personal computer (not shown).

Figure 3:
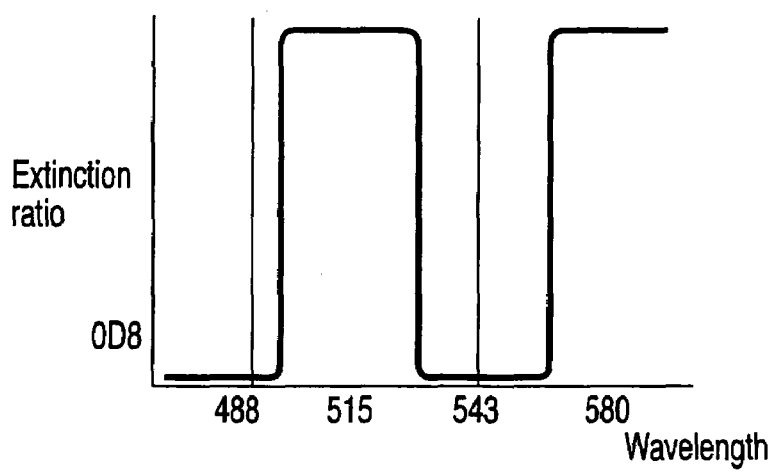
FIG. 3 is a view showing characteristics of a filter for cutting laser beam shown in FIG. 2.

In this case, the light having transmitted the sample 1 enters a lower optical path. In the present embodiment, a filter 291 is used as an upper laser beam cutting mechanism. That is, the laser beam from upper side reaches the filter 291 and the filter 291 transmits the fluorescence from the sample 1, but interrupts the laser beam from upper side so as to prevent the laser beam from upper side from reaching detectors 281 and 282 (i.e., from invading an observation system). In this manner, in the case where the fluorescence from the sample 1 is detected by means of the detectors 281 and 282, the laser beam from upper side does not reach the detectors 281 and 282. With respect to the laser beam having transmitted the sample 1 from lower side and having entered the upper optical path as well, similarly, the filter 191 is used as a laser beam cutting mechanism, whereby the lower laser beam is cut. Here, it is preferable to use the filters 191 and 291 each having a high OD value (optical density value) for the target laser wavelength. It is preferable to use the filters having an OD value of at least 4 or more, more preferably the OD value of 5, and most preferably the OD value of 6 or more. In this case, in the case of a sample having two-wavelength fluorescence, a barrier filter having a characteristic double band as shown in FIG. 3 is disposed to cut only the laser beam as shown in FIG. 2. In addition, in the case of a sample having three-wavelength fluorescence, although a tripe band filter is disposed, it is highly difficult to manufacture such a double band or triple band filter. Therefore, a system of switching a barrier filter having a single wavelength by using a filter wheel may be used.

Further, a description will be given here. In a lower laser scanning optical system consisting of a lower objective lens 226 and a scanning optical system 222 or the like as well, in the same manner as that described above, laser beam having a predetermined wavelength from the laser unit 4 is irradiated to a sample, fluorescence is excited. Then, fluorescence is detected by means of the detectors 281 and 282, thereby making it possible to carry out fluorescence observation of the sample. For example, in the case where the upper laser scanning optical system is used as stimulation laser scanning means and the lower laser scanning optical system is used as observation laser scanning means, fluorescence observation for irradiating excitation light and acquiring fluorescence is carried out in the lower laser scanning optical system. In this case, the filters 261 and 262 and the filters 271 and 272 each have a function for cutting an excitation wavelength for fluorescence observation in the same manner as that described above. On the other hand, stimulation laser beam is irradiated to a sample from the upper laser scanning optical system which functions as stimulating means. The stimulation laser beam transmits the sample, and the resulting light is made incident directly to the lower laser scanning optical system. In general, a wavelength of the stimulation laser beam is different from an excitation wavelength for fluorescence observation, thus making it impossible to cut the wavelength of the stimulation laser beam by means of the filters 261 and 262 and the filters 271 and 272. Therefore, in the present invention, the invasion of the stimulation laser beam into the detectors 281 and 282 is prevented by disposing the laser cutting filter 291 having a function for cutting a wavelength of the stimulation laser beam.

Second Embodiment

Figure 4B:
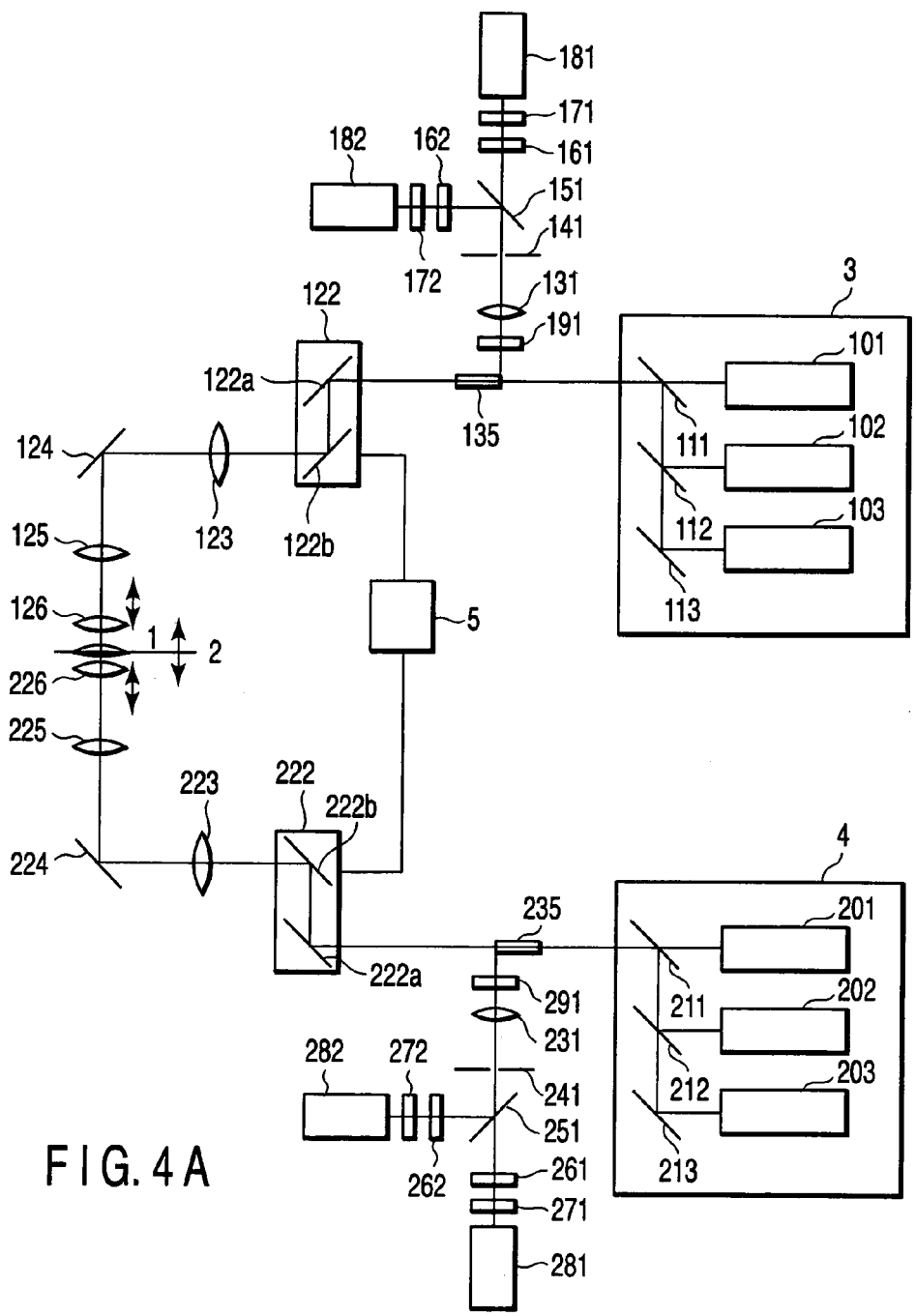
Figure 4B:
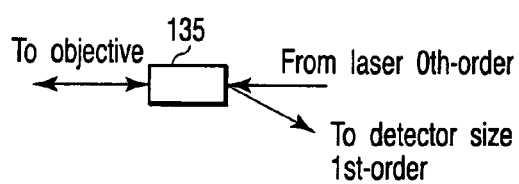
Figure 4C:
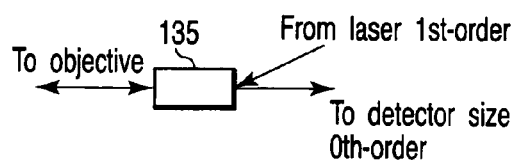

A second embodiment will be described with reference to FIGS. 4A to 4C. FIGS. 4A to 4C are views each showing a configuration of a laser scanning microscope according to the second embodiment of the present invention. FIG. 4A is a view showing a whole schematic configuration; FIG. 4B is a view showing a case in which laser beam in a 0th-order direction is inputted to an AOTF 135 (and 235) such as an acoustic optical element; and FIG. 4C is a view showing an case in which laser beam in a first-order direction is inputted to the AOTF 135. In addition, in FIG. 4A, the same constituent elements in FIG. 1 are designated by the same reference numerals.

As shown in FIG. 4A, in the present embodiment, the AOTF 135 is used in place of a dichroic mirror 121 and a filter 191 (in the case of FIG. 4B), or alternatively, the AOTF 135 is used in place of the dichroic mirror 121 (in the case of FIG. 4C). The AOTF 135 can be switched at a higher speed than in the case where a filter wheel is used as the filter 191 in the first embodiment. In addition, the AOTF 135 can selectively use only a plurality of wavelengths as barriers at the same time.

In FIG. 4B, laser beam is made incident to the AOTF 135 in the 0th-order direction, and fluorescence is outputted in the first-order direction of the AOTF 135. With such a configuration, although a wavelength cannot be selected in the 0th-order direction, it is possible to select a wavelength in the first-order direction. Thus, although a wavelength cannot be selected for laser beam, a fluorescence wavelength can be selected. Therefore, the filters 191 and 291 in the first embodiment are eliminated. On the other hand, as shown in FIG. 4C, in the case where the laser beam is made incident to the AOTF 135 in the first-order direction, it becomes possible to select a wavelength for laser beam. However, a fluorescence wavelength cannot be selected, thus requiring the filters 191 and 291 in the same manner as that in the first embodiment.

Third Embodiment

Figure 5A:
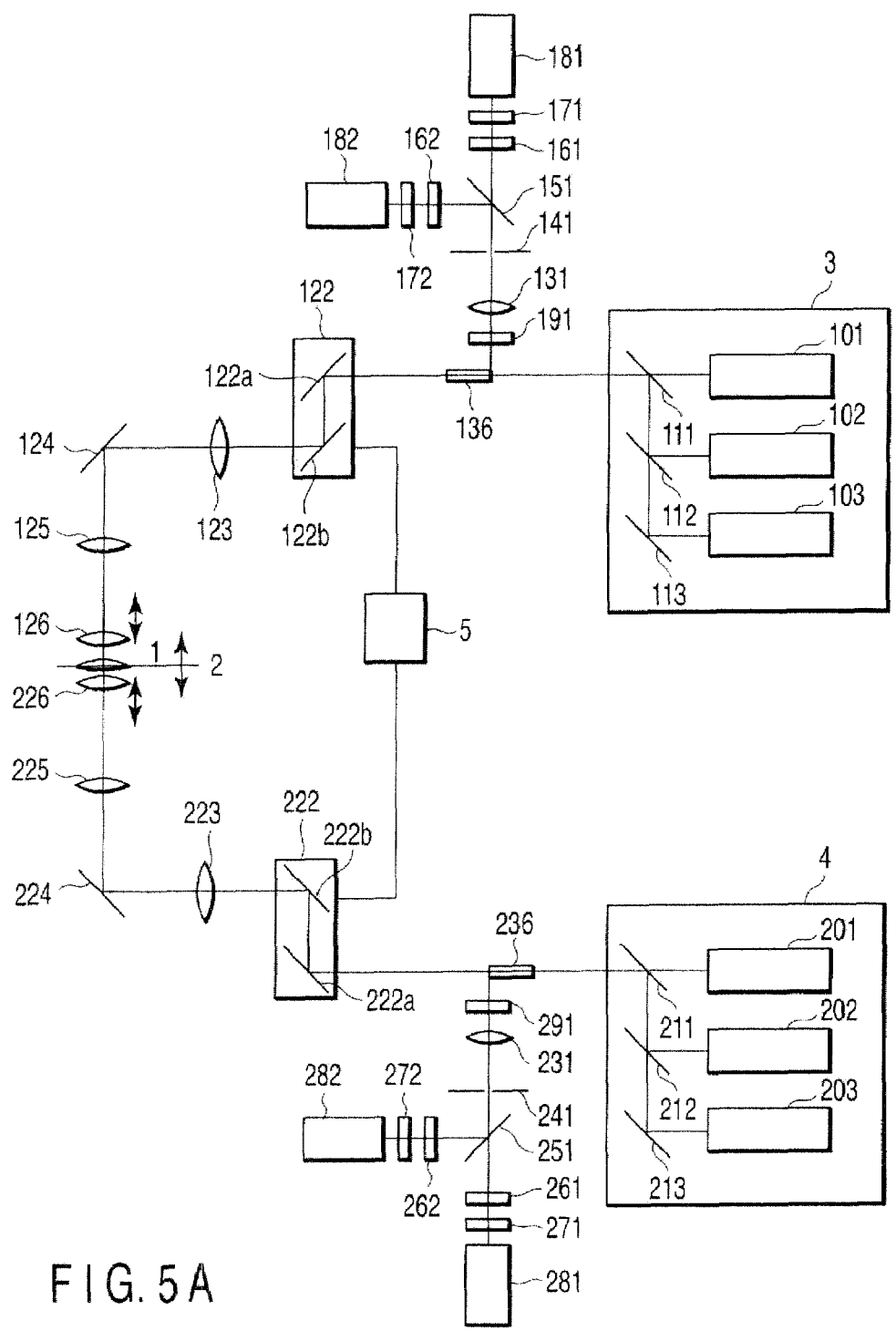
FIGS. 5A and 5B are views each showing a configuration of a laser scanning microscope according to a third embodiment of the present invention.
Figure 5B:
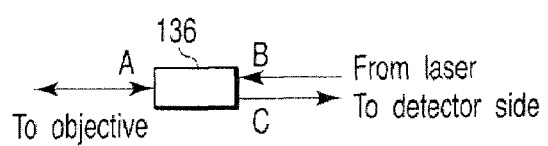

A third embodiment will be described with reference to FIGS. 5A and 5B. FIGS. 5A and 5B are views each showing a configuration of a laser scanning microscope according to the third embodiment of the present invention. FIG. 5A is a view showing a whole schematic configuration; and FIG. 5B is a view showing an operation of a circulator 136. In addition, in FIG. 5A, the same constituent elements as those in FIG. 1 are designated by the same reference numerals.

As shown in FIG. 5B, the circulator 136 (236) has three connection terminals, wherein a connection terminal A is a connection terminal at the side of an objective lens; a connection terminal B is a connection terminal at the side of a laser; and a connection terminal C is a connection terminal at the side of a detector. The light input from or output to each of the connection terminals is shown below.

Connection terminal A: Laser beam output and fluorescence input
Connection terminal B: Laser beam input
Connection terminal C: Fluorescence output In this way, the laser beam incident from the connection terminal B is irradiated from the connection terminal A, and the fluorescence inputted from the connection terminal A is irradiated from the connection terminal C. Therefore, in the configuration according to the present embodiment as well, a function similar to the dichroic mirrors 121 (221) shown in the first embodiment can be obtained.

Fourth Embodiment

Figure 6:
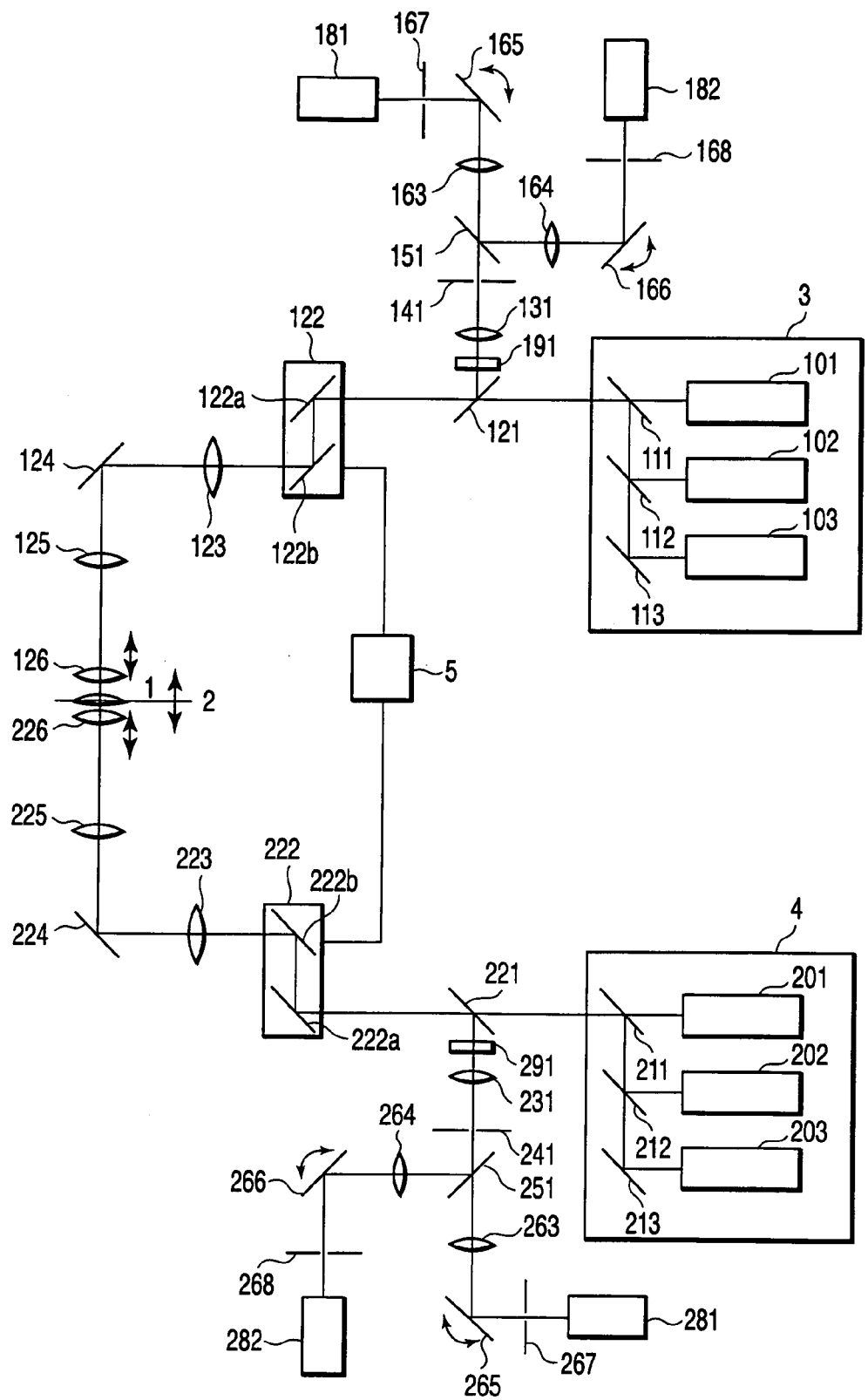
FIG. 6 is a view showing a configuration of a laser scanning microscope according to a fourth embodiment of the present invention.

A fourth embodiment will be described with reference to FIG. 6. FIG. 6 is a view showing a configuration of a laser scanning microscope according to the fourth embodiment of the present invention. In FIG. 6, the same constituent elements as those in FIG. 1 are designated by the same reference numerals.

In the present embodiment, an operation for causing a wavelength of a sample having two-wavelength fluorescence to be separated by means of a dichroic mirror 151 through a pin hole 141 is similar to that according to the first embodiment. Thus, a description is omitted here. In the present embodiment, spectra having a required wavelength region is acquired by means of spectroscopy, and then, data on a laser wavelength is ignored. Therefore, there are provided plane gratings 165 and 166. These plane gratings 165 and 166 are rotatable around an axis vertical to a plane which includes an optical axis (which includes an optical axis of light before or after reflected by the gratings), whereby the incident fluorescence is obtained as spectra (spectral-factorized).

Specifically, the fluorescence having transmitted the dichroic mirror 151 is made incident to the plane grating 165 via an image forming lens 163, and the incident fluorescence is spectral-factorized. At this time, a center wavelength of the fluorescence having passed through a variable slit 167 can be adjusted by changing an angle of the plane grating 165 with respect to an incident optical axis. A detection wavelength width relevant to the center wavelength can be adjusted by changing a slit width of the variable slit 167. Then, the spectrum decomposed fluorescence is made incident to the variable slit 167, and transmits the variable slit 167, whereby a fluorescence spectrum range is limited, and only the fluorescence having passed the variable slit 167 is detected by means of a detector 181. The fluorescence reflected on the dichroic mirror 151 is made incident to the plane grating 166 via an image forming lens 164 as described above, and the incident fluorescence is spectral-factorized. Then, the spectral-factorized fluorescence is made incident to the variable slit 168, and the incident fluorescence is passed through the variable slit 168, whereby the fluorescence spectrum range is limited, and only the fluorescence having passed through the variable slit 168 is detected by means of a detector 182.

Fifth Embodiment

A method for cutting laser beam in the case where a laser beam cutting mechanism using an optical element is not provided will be described in the above configuration according to each of the embodiments. The configuration according to the present embodiment is similar to a case in which an optical element is not provided as a laser cutting mechanism in each of the embodiments described above. Thus, an illustration and a description are omitted here. In this way, in the case where a laser cutting mechanism using an optical element is not provided, the upper laser beam enters the detector on the opposite side, that is, a lower detector 281 or 282 and the lower laser beam enters an upper detector 181 or 182 when a laser beam scanning point using a laser scanning optical system 122 or 222 reaches the same point of the sample 1. That is, as shown in FIG. 7, in the case where the upper scanning region and the lower scanning region overlap each other, there is a possibility that the upper and lower scanning points are identical to each other.

In this case, this problem can be avoided by changing scanning control so that the upper scanning region and the lower scanning region does not overlap each other. For example, in FIG. 7, if the lower scanning region is scanned in a direction indicated by the arrow and the upper scanning region is scanned in a direction opposite to that indicated by the arrow, there is a possibility that the scanning points are identical to each other at a portion at which the upper and lower scanning regions overlap each other. Then, the upper scanning region and the lower scanning region are scanned in the direction indicated by the arrow at the same time. For example, the scanning point of the upper laser scanning optical system is scanned by means of the lower laser scanning optical system with a delay of a predetermined time or vice versa. By doing this, when scanning an overlap portion of the scanning region using the lower laser scanning optical system, the scanning using the upper laser scanning optical system has terminated scanning of the overlap portion of the scanning region. Thus, no scanning point overlaps. In this manner, it is possible to avoid an overlap of the scanning points by controlling the scanning direction. Therefore, according to the present embodiment, even in the case where a laser beam cutting optical element is not provided, the laser beam from the other stimulation laser scanning optical system can be prevented from invading the observation laser scanning optical system.

Sixth Embodiment

A sixth embodiment will be described with reference to FIGS. 8A to 8D. FIGS. 8A to 8D are views each showing an example of an operation according to the sixth embodiment of the present invention. FIG. 8A is a view showing an operating wavelength of an X-galvano mirror; FIG. 8B is a view showing an image acquisition timing in the case of a one-way scan; FIG. 8C is a view showing an image acquisition timing in the case of a reciprocal scan; and FIG. 8D is a view showing a stimulation timing. A configuration according to the sixth embodiment is identical to that shown in FIG. 1. An illustration and a description are omitted here.

In the case where XY scanning is carried out to acquire an image, it is general to carry out deflection by means of a laser scanning optical system up to a region which is slightly wider than a region in which an attempt is made to acquire an image. Here, in the case of acquiring an image, an image is acquired at only a region with good linearity, as shown in FIGS. 8B and 8C. That is, in the case of a one-way scan, in the waveform shown in FIG. 8A, scanning for one line is carried out at a rise portion. In the case of a reciprocal scan, scanning for one line is carried out for each of the rise portion and a fall portion. Here, in FIG. 8B or FIG. 8C, there is no need for exciting a sample at a portion (time interval) at which no image is acquired. Thus, an acoustic optical element such as AOTF or direct laser beam is turned OFF so as not to apply the laser beam to the sample. Therefore, as shown in FIG. 8D, by utilizing a time interval at which this image is not acquired, it is possible to apply a stimulus without affecting an acquired image by applying a stimulus once or a plurality of times (twice in the figure) by means of a scanning optical system in which no image is acquired.

The description above is an example of utilizing a loop period of a line end in line scanning (main scanning) as a stimulation period. Similarly, when scanning a next frame after one frame scanning, a retrace period for returning a scanning point to a scanning start point can be used as a stimulation period. In this case, stimulation light can be irradiated between frames. In the line scanning, a fall portion of the FIG. 8A can be used to stimulate the sample at the one-way scan.

In the present embodiment, at a time interval at which no image is acquired by means of one scanning optical system, a stimulus is applied by means of the other scanning optical system. However, there are many types of an excitation wavelength and a stimulation wavelength, it is deemed difficult to prepare all of the corresponding barrier filters. In such a case, two above and below scanning optical systems may be alternately switched on a frame by frame, line by line, or pixel by pixel basis, thereby carrying out scanning. In this manner, it is possible to acquire data with respect to the above and below scanning optical systems without being affected by the other system. This can be accomplished by making control at a control unit 5 so that scanning timings of the above and below scanning optical systems do not overlap each other. In addition to disposing the two laser microscopes on the above and below, only one control unit will suffice by intensively making control, thus making it possible to achieve cost reduction and space efficiency. In addition, such a control unit is used via a man-machine interface such as a PC, thereby facilitating control or improving a user's operability.

The foregoing embodiments may be applied independently or may be properly applied in combination with each other. In addition, the present invention is not limited to each of the foregoing embodiments. At the stage of carrying out the invention, various modifications can occur without departing from the spirit of the invention.

For example, while the foregoing embodiments have described an example in which the barrier filter 191 is provided separately from the filters 161, 171, 162, and 172 or the like, the filters 161, 171, 162, and 172 are configured so as to have performance of the barrier filter 191, thereby eliminating use of the barrier filter 191. In addition, the dichroic mirror 121 or 151 may have the performance of the barrier filter 191.

Figure 16:
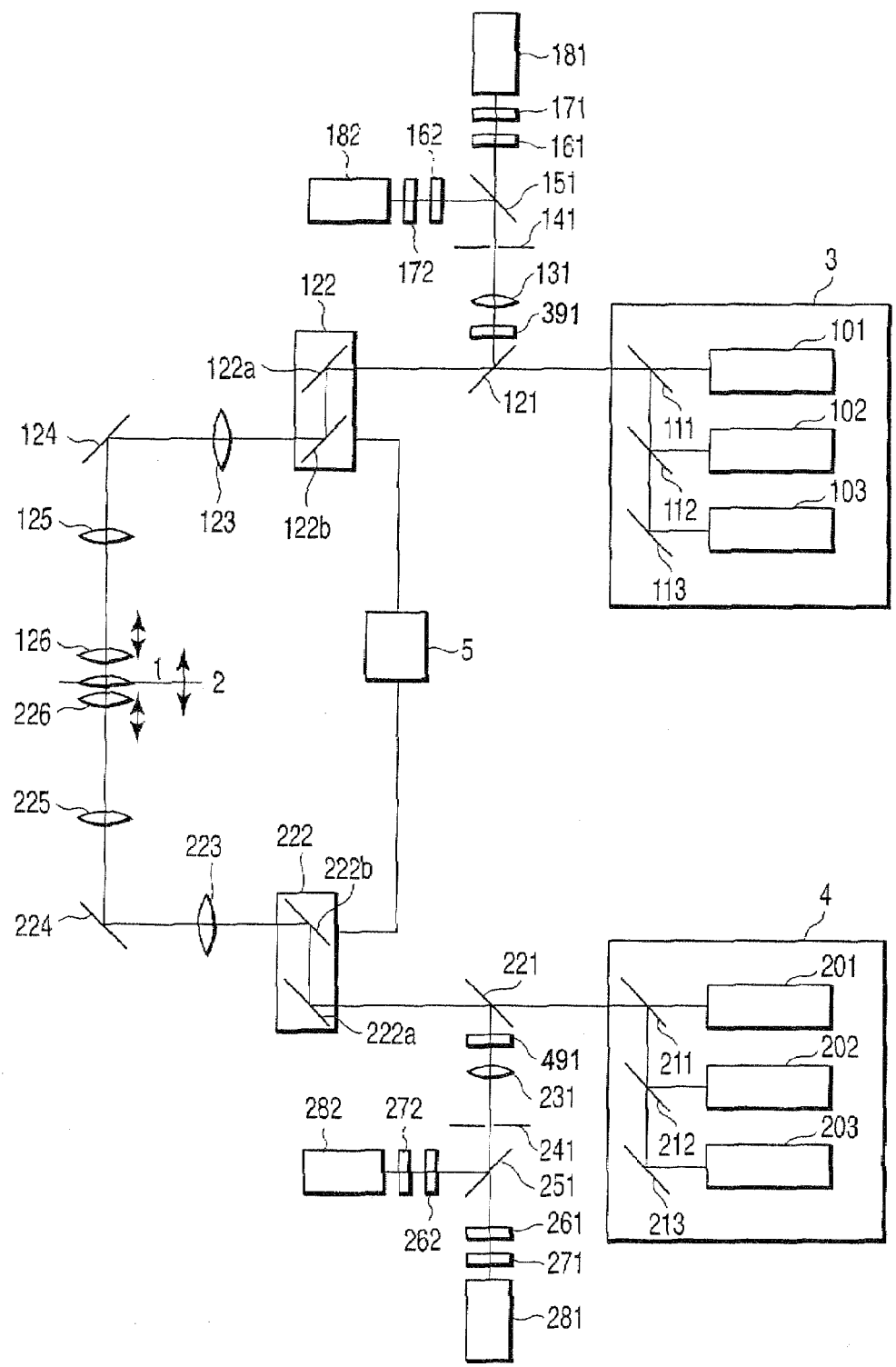
FIG. 16 is a view showing a configuration of a laser scanning microscope according to a modification of the first embodiment of the present invention.

A laser generally has a polarizing direction. From this fact, the laser beam according to one of the above and below scanning optical systems (for example, upper scanning optical system) may be defined as P-polarization; and the laser beam according to the other scanning optical system (for example, lower scanning optical system) may be defined as S-polarization. In this case, as shown in FIG. 16, which illustrates the use of polarizing filters in a modification to the structure shown in FIG. 1, a polarizing filter 491 which does not transmit P-polarization and a polarizing filter 391 which does not transmit S-polarization are interposed between samples and detectors at the lower scanning optical system and at the upper scanning optical system, respectively, thereby making it possible to acquire data without being affected by the other laser beam.

While the above embodiments have described a laser scanning microscope, the same advantageous effect can be attained with the above configuration in the case where a total reflection microscope has been disposed at the upper side or at the lower side.

In addition, while the foregoing embodiments each have described a single photon laser scanning microscope, a multi-photon laser scanning microscope is known as a laser scanning microscope. In the case of using the multi-photon laser scanning microscope, excitation of a sample using multi-photons occurs only in the vicinity of a focal point at which photon density is extremely high. Thus, there is no need for disposing a pin hole at a position conjugated to a focal position of an objective lens. Therefore, in this case, a detector can be disposed in the vicinity of the objective lens (for example, in an optical path which is branched before a point returning to the scanning optical system 122). The same advantageous effect can be obtained in the multi-photon laser microscope by disposing a laser beam cutting mechanism before the detector in the same manner as in the above embodiment.

In the laser scanning microscope, an image at an arbitrary position in the optical axis direction (Z direction) of the sample 1 can be observed by moving a stage 2 in the optical axis direction. In the laser scanning microscope having laser scanning optical systems disposed on the above and below thereof, for example, if the stage 2 is moved in order to change an observation position in the upper scanning optical system, the observation position at the lower scanning optical system also moves. Thus, it is preferable to change a focal position from an objective lens in order to change the observation position without moving the stage 2. In this manner, the focal position in the Z direction is changed without moving the stage 2, thereby making it possible to change the observation position. When this focal position is changed, it is possible to change a focal position from an objective by changing the coherent light beams from the laser units 3 and 4, for example, from parallel light beams (indicated by the solid line) to convergence light beams (indicated by the dashed line) as shown in FIG. 9. In this way, the focal position can be changed without moving the stage 2. Thus, even if the focal position of one scanning optical system is changed, the focal position of the other scanning optical system is not changed.

A focal position may be changed by making wave surface control using a deformable mirror as a method for changing the focal position. An example of such a configuration is shown in FIG. 10. In FIG. 10, the same constituent elements in FIG. 1 are designated by the same reference numerals. A detailed description will be omitted here.

As shown in FIG. 10, the laser beam from a light source 3 is made incident to a dichroic mirror 121 via a collimator lens 31. The laser beam reflected on the dichroic mirror 121 is made incident to a mirror (deformable mirror) 142 whose shape can be varied as a wave surface converter element, and a wave surface is adjusted. The wave surface adjusted laser beam is deflected by means of a gimbal mirror 147 (XY scanning optical system) via relay optical systems 144 and 146. The deflected light is made incident to the objective lens 126 via the relay optical system 148 and an image forming lens 125, and the incident light is focused at a focal position of the sample 1 at the objective lens 126.

The fluorescence from the sample 1 advances back in the optical path, and returns to the dichroic mirror 121. The fluorescence is inputted to the detectors 181 and 182, and the inputted fluorescence is photoelectrically converted, and the converted fluorescence is produced as digital data by means of an A/D converter, although not shown. Then, the digital data is disposed as a confocal image on a monitor on a personal computer, although not shown. An output of the detector 181 or 182 is forwarded to a control unit 5, whereby a shape variable mirror 142 is controlled and a light beam is formed in a desired shape. A focal position can be changed in units of one frame or during one frame image acquisition by changing the shape variable mirror 142 at a high speed.

In addition, as illustrated in FIG. 1 or the like, the objective lens 126 of the upper laser scanning optical system or an objective lens 226 of the lower laser scanning optical system are moved along the optical axis direction, whereby the focal position at one of the upper and lower positions can be changed. A known quasi-focusing device can be utilized as means for moving the objective lens.

As has been described above, according to the embodiment of the present embodiment, when an image is acquired by the above and below microscopes, the image can be acquired in real time in which the behavior in cells is seen while a stimulus is applied.

In addition, with respect to an observation image, although an attempt is made to acquire data at a site at which stimulation light is applied to a sample and at the same timing, in general, an attempt is made to acquire data before and after stimulation. However, when the laser wavelengths for stimulation and observation are identical to each other, the desirable data before and after stimulation cannot be essentially acquired at a timing at which the stimulation and observation scan positions are identical to each other. In the embodiment of the present invention, however, data can be acquired so that the stimulation and observation scan positions are not identical to each other.

In addition, in the conventional technique, the stimulation and observation focal points are separately set by means of a stage for vertically moving an objective lens and a sample of the upper laser scanning optical system. If the sample is moved, however, the focal position of the upper objective lens also changes. Thus, if an observation site is changed at the stage in the case where the upper optical system is used for stimulation and the lower optical system is used for observation, the stimulation site also changes. However, according to the embodiment of the present invention, the observation site and the stimulation site can be changed without moving the position of the sample, enabling universal stimulation and observation.

Seventh Embodiment

The present embodiment describes an example of measuring a specific ion concentration distribution in a sample and a change with time thereof, by using a scanning laser microscope.

Figure 11:
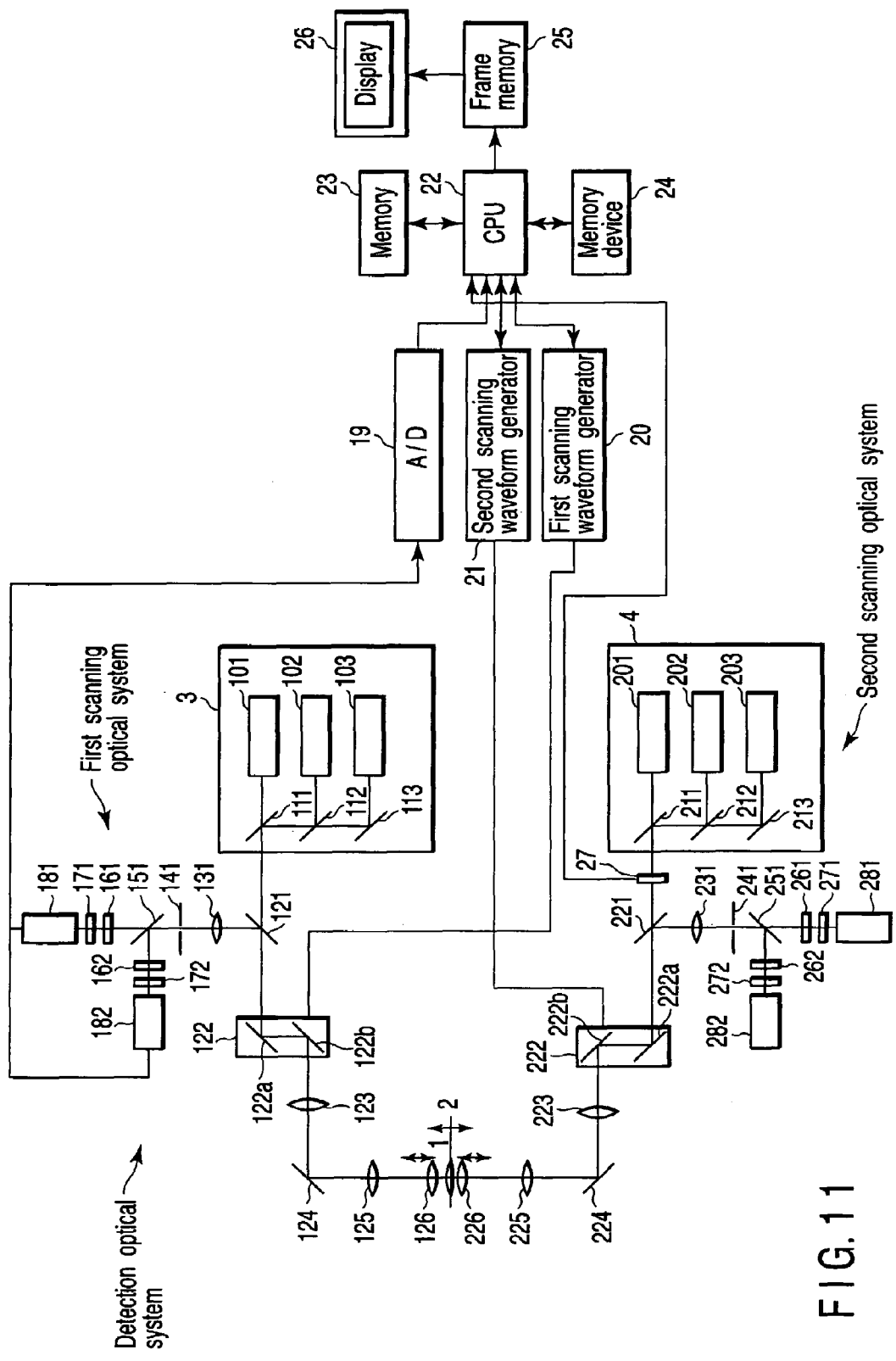
FIG. 11 is a block diagram depicting a scanning laser microscope in accordance with a seventh embodiment.

FIG. 11 is a block diagram depicting a scanning laser microscope in accordance with the present embodiment. The same constituent elements in FIG. 1 are designated by the same reference numerals. In the present embodiment, a laser control element 27 connected with a CPU 22 is added to a second scanning optical system B. In addition, FIG. 11 shows an A/D converter 19, a first scanning waveform generator circuit 20, a second scanning waveform generator circuit 21, the CPU 22, a memory 23, a memory device 24, a frame memory 25, and a display 26 which are a control system.

A scanning optical system 122 is connected to the first scanning waveform generator circuit 20. A scanning optical system 222 is connected to the second scanning waveform generator circuit 21. Photoelectric converter elements 181 and 182 each are connected to the A/D converter 19. In addition, the first scanning waveform generator circuit 20, the second scanning waveform generator circuit 21, and the A/D converter 19 each are connected to the CPU (central processing unit) 22. Further, the CPU 22 is connected to the memory 23, and is also connected to the display 26 via the frame memory 25.

The CPU 22 issues a control command to each section. For example, the CPU 22 starts scanning by indicating a scanning waveform such that the laser beams from first and second laser beam sources 3 and 4 scan a desired region with respect to the first and second scanning waveform generator circuits 20 and 21 for operationally controlling optical scanners 122a and 122b and optical scanners 222a and 222b of scanning optical units 122 and 222, for example or images digital data from the A/D converter 19. In addition, the CPU controls a laser control element 27 of the second scanning optical system B described later.

The memory 23 stores the digital data from the A/D converter 19 or a scan image formed in the CPU 22. The display 26 displays the scan image formed in the CPU 22 and stored in the memory 23 via the frame memory 25.

Here, the CPU 22, the memory 23, and the frame memory 25 or the like may utilize a general personal computer or the like. In addition, a control method described later can be processed in accordance with a computer program, and the processing program is stored in a recording medium such as CD-ROM or the memory device 24 such as hard disk. In addition, the processing program may be read out via a communication network.

The processing program is read out onto the memory 23 of the personal computer as required, and is executed by means of the CPU 22, thereby controlling each device connected to the personal computer.

Now, an operation of the thus configured scanning laser microscope will be described here. The laser beam from the first laser beam source 3 is guided to the scanning optical unit 122 whose scanning is controlled by means of the first scanning waveform generator circuit 20, and the guided laser beam is deflected and scanned in an arbitrary direction. This laser beam is made incident to an objective lens 126 via a mirror 124 and an image forming lens 125, and the incident light is focused at a focal position of a sample 1 at the objective lens 126 after a beam diameter has been changed to an pupil diameter of the objective lens 126 by means of an pupil projecting lens 123.

The sample 1 is excited by the focused light, and emits fluorescence. This fluorescence advances back in an optical path, and returns to a dichroic mirror 121. The dichroic mirror passes through an excitation wavelength of the laser beam, and reflects a fluorescence wavelength, whereby the excitation wavelength and fluorescence wavelength are separated from each other. The fluorescence reflected on the dichroic mirror 121 is guided to a detection optical system C. An operation of the detection optical system C is identical to that according to the first embodiment. A duplicate description is omitted here.

An output signal from detectors 181 and 182 is guided to the A/D converter 19, and the guided output signal is converted to a digital signal in synchronism with scanning control. Then, the converted digital signal is displayed on the display 26 in response to a scanning position via the frame memory 25. The displayed image shows a distribution of a fluorescence image in the sample 1 (two-dimensional distribution of fluorescence brightness), i.e., a distribution of a desired ion concentration in the sample 1.

On the other hand, with respect to the laser beam from the second laser beam source 4, the laser intensity or the like is adjusted by means of the laser control element 27 controlled by the CPU 22. The adjusted laser intensity is combined with an optical axis from the first scanning optical system A via the scanning optical unit 222, an pupil projecting lens 223, and a mirror 224. Then, the combined laser beam transmits an image forming lens 225 and an objective lens 226, and is irradiated onto the sample 1. With respect to the irradiation position in the sample 1 at this time, the scanning optical unit 222 is controlled by means of the CPU 22, thereby making it possible to select an arbitrary position which does not depend on a scanning position of the first scanning optical system A.

When the laser beam from the second laser beam source 4 is thus irradiated to the sample 1 into which a caged reagent has been introduced, a caged group of the caged reagent at the irradiated site is collapsed, and a substance included therein is discharged. A change of the above ion concentration distribution in the sample 1 due to this discharge can be measured in accordance with an image obtained by the above first scanning optical system A.

Now, a description will be given with respect to scanning of the first scanning optical system A for the sample 1 and control of irradiation of the laser beam onto the sample 1 from the second scanning optical system B.

The CPU 22 is connected to: the first scanning waveform generator circuit 20 for scanning and controlling mirrors 122a and 122b of the scanning optical unit 122; and the second scanning waveform generator circuit 21 for scanning and controlling mirrors 222a and 222b of the scanning optical unit 222.

The CPU 22 starts scanning control by indicating a scanning waveform such that the laser beam from the first laser beam source 3 scans a target range in the target sample 1 with respect to the first scanning waveform generator circuit 20 in order to obtain a fluorescence image. In addition, together with indicating this scanning waveform, this CPU indicates a scanning waveform to the second scanning waveform generator circuit 21 so that the laser beam from the second laser beam source 4 scans a desired region in which a caged reagent is collapsed.

Figure 12:
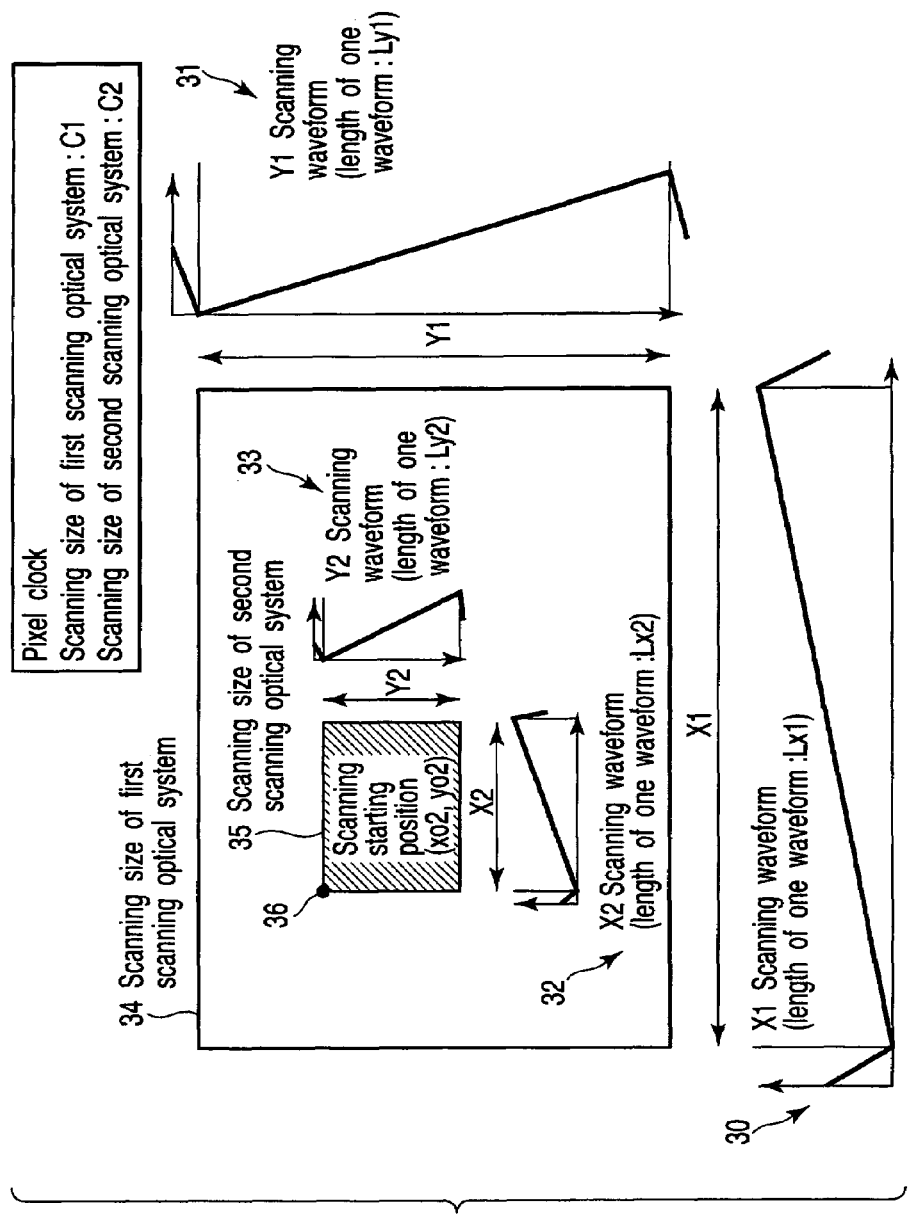
FIG. 12 is a view showing a relationship between a scanning waveform and a scanning operation in accordance with the seventh embodiment and an eighth embodiment.

FIG. 12 shows a relationship between a scanning waveform and a scanning operation in accordance with the present embodiment. In FIG. 12, reference numeral 34 denotes a scanning region of the first scanning optical system, wherein a horizontal direction of the scanning region 34 of this first scanning optical system is represented by X1 and a vertical direction thereof is designated by Y1. In addition, a scanning waveform 30 indicates a scanning waveform in the X1 direction (a length of one waveform is represented by Lx1), and scanning waveform 31 indicates a scanning waveform in the Y1 direction (a length of one waveform is represented by Ly1).

In addition, a horizontal direction of a scanning region 35 of the second scanning optical system is represented by X2, and a vertical direction thereof is represented by Y2. In addition, a scanning waveform 32 indicates a scanning waveform in the X2 direction (a length of one waveform is represented Lx2), and a scanning waveform 33 indicates a scanning waveform in the Y2 direction (a length of one waveform is represented by Ly2).

In addition, a pixel clock of the first scanning optical system is represented by C1, and a pixel clock of the second scanning optical system is represented by C2. Reference numeral 36 indicates a scanning start position (xo2, yo2) of the second scanning optical system.

In the meantime, the first scanning waveform generator circuit 20 whose scanning start has been instructed by the CPU 22 outputs the scanning waveforms 30 and 31 instructed by the CPU 22 to two mirrors 122a and 122b incorporated in the scanning optical unit 122, respectively. Here, the mirror 122a carries out main scanning in the horizontal direction, and the mirror 122b carries out sub-scanning in the vertical direction.

In this manner, laser beam starts two-dimensional scanning in the sample 1. When the outputs of scanning waveforms 30 and 31 are started, the first scanning waveform generator circuit 20 outputs a variety of sync signals (clock signal, vertical sync signal, or horizontal sync signal), although not shown, to the A/D converter 19. From among a variety of these sync signals, the A/D converter 19 A/D converts a fluorescence brightness signal outputted from the detectors 181 and 182 by means of a clock signal generated on a pixel by pixel basis (pixel clock C1 of the first scanning optical system shown in FIG. 12).

Then, in the CPU 22, an image is formed on the memory 23 from the digital data, vertical sync signal, and horizontal sync signal obtained by means of the A/D converter 19, and the formed image is displayed on the display 26 via the frame memory 25. In this case, one image is produced for one cycle of the vertical sync signal.

The thus obtained image is produced as an image which indicates an initial state of the ion concentration distribution in the sample 1 before the caged reagent is collapsed. After one or a plurality of images has been measured, the CPU 22 instructs the first scanning waveform generator circuit 20 to start scanning, and starts image acquisition. Then, the CPU 22 instructs the laser control element 27 to indicate a laser intensity or the like at a desired timing and instructs the second scanning waveform generator circuit 21 to start scanning.

The second scanning waveform generator circuit 21 whose scanning start has been instructed by the CPU 22 outputs scanning waveforms 32 and 33 instructed by the CPU 22 to two mirrors 222a and 222b incorporated in the scanning optical unit 222, respectively. Here, the mirror 222a carries out main scanning in the horizontal direction and the mirror 222b carries out sub-scanning in the vertical direction.

When the laser beam from the second scanning optical system B is irradiated to the sample 1, the caged reagent is collapsed. The subsequent scanning image obtained from the scanning of the first scanning optical system A indicates a change in the sample due to the collapse of the caged reagent.

At this time, in a region in which the scanning in the first scanning optical system A and the scanning in the second scanning optical system B overlap each other, the laser intensity or the like is adjusted by means of the laser control element 27 so as not to irradiate the laser beam into the same region at the same time. In general, when the scanning in the first scanning optical system and the scanning in the second optical system are started in an asynchronous manner, there is a possibility that the laser beams are irradiated in one region contained in a scanning region at the same time. According to the present invention, while the first scanning optical system scans a region in which the scanning in one scanning optical system overlaps that in another scanning optical system, irradiation of the laser beam in the second scanning optical system is stopped.

Figure 13:
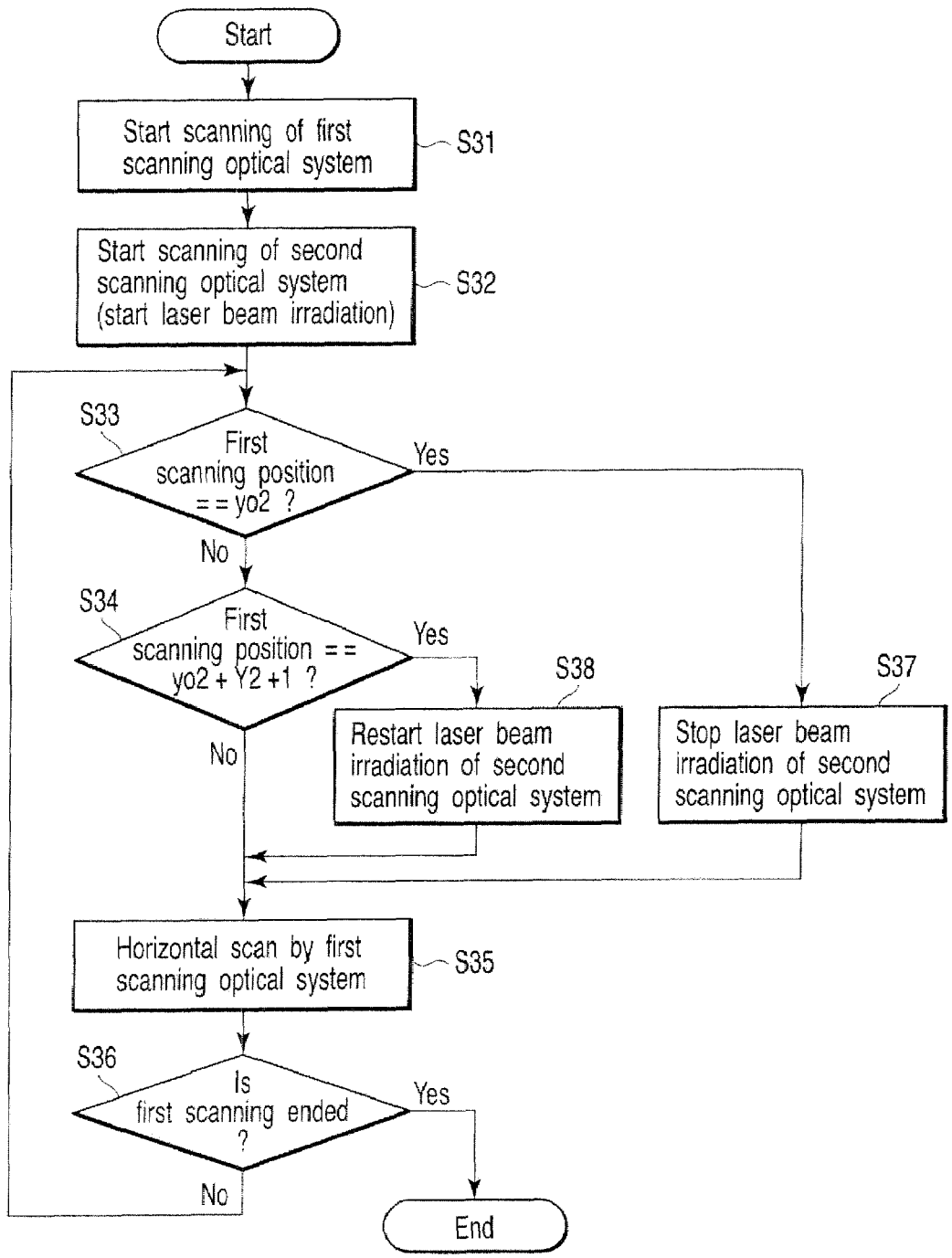
FIG. 13 is a view showing a flow of irradiation control of laser beam in accordance with the seventh embodiment.

Irradiation control of laser beam in a region in which the scanning in the first scanning optical system and the scanning in the second scanning optical system overlap each other will be described with reference to FIG. 13 by way of example of a case in which scanning is carried out by using the scanning waveform shown in FIG. 12. FIG. 13 shows a flow in the case of acquiring one image. This flow is repeated in the case of acquiring a plurality of images.

First, scanning in the first scanning optical system with respect to the scanning region 34 is started (S31). Then, scanning in the second scanning optical system with respect to the scanning region 35 is started at a desired timing (S32). At this time, irradiation of the laser beam in the second scanning optical system is started at the same time.

When a scanning position in the vertical direction of the first scanning optical system reaches yo2 (S33), irradiation of the laser beam in the second scanning optical system is stopped (S37). Next, when the scanning position in the vertical direction of the first scanning optical system reaches yo2+Y2+1 (S34), irradiation of the laser beam in the second scanning optical system is restarted (S38). In this manner, while the scanning position in the vertical direction of the first scanning optical system ranges from yo2 to yo2+Y2, irradiation of the laser beam in the second scanning optical system is stopped, so that no laser beam is irradiated in the same region at the same time.

The scanning in the horizontal direction of the first scanning optical system is repeated throughout the scanning region 34 (S35). When an end position of the scanning region 34 has been reached (S36), acquisition of one image is completed.

As has been described above, it becomes possible to eliminate influence of the laser beam between the scanning optical systems in measuring a change with time in ion concentration distribution or in experimentation of FRAP when a specific phenomenon is generated in a desired region by using a plurality of scanning optical systems.

In the seventh embodiment described above, although the irradiation of the laser beam in the second scanning optical system is controlled, the irradiation of the laser beam in the first scanning optical system may be controlled. In this case, the laser control element 27 is provided at the optical path side of the light source 1.

In the seventh embodiment described above, although the laser control element is utilized, emission of the laser beam may be controlled in the case where the light source is a solid laser.

The scanning range of the second scanning optical system (stimulation laser scanning optical system) may be a desired one point or one line, apart from a region as shown in FIG. 12.

In addition, positional information on a scan point at which the first scanning optical system (upper laser scanning optical system) carries out scanning and positional information on a scan point at which the second scanning optical system (lower laser scanning optical system) carries out scanning are managed in real time, and, only when the scan points of both of the scanning optical systems coincide with each other, control may be made so as to stop laser irradiation of the second scanning optical system (stimulation scanning optical system).

Eighth Embodiment

In the present embodiment, a first scanning optical system is scanned in a retrace area of scanning in a second scanning optical system. Thus, even in the case where scanning regions of the scanning optical systems overlap each other, the laser beam from the first scanning optical system and the laser beam from the second scanning optical system are prevented from overlapping at one point in a scanning region. The present embodiment describes an example of measuring a specific ion concentration distribution in a sample and a change with time thereof, by using a scanning laser microscope. The constituent elements according to the present embodiment are not illustrated (not shown) because they are identical to those shown in FIG. 11 except that the laser control element 27 is eliminated. Therefore, a duplicate description of an operation of the same elements according to the seventh embodiment is omitted here.

A delay time of a scanning start time of the second scanning optical system with respect to a scanning start time of the first scanning optical system will be described by way of example of a case in which scanning is carried out using the scanning waveform as shown in FIG. 12. In general, when the scanning in the first scanning optical system and the scanning in the second scanning optical system are started in an asynchronous manner, there is a possibility that the laser beams overlap each other at one point in a scanning region. According to the present embodiment, the scanning start time of the first scanning optical system or the scanning start time of the second scanning optical system is delayed so that such one point becomes a horizontal or vertical retrace area of the second scanning optical system.

A specific description will be given below. In FIG. 12, referring to a scanning waveform 32, for example, a left end of the scanning waveform 32 goes down rapidly, then goes up slightly toward the right, and then, goes down rapidly again. Among them, a waveform portion going up gently toward the right indicates that scanning is carried out while laser beam is irradiated. Then, the waveform going down rapidly at both ends indicates a retrace area, and indicates that the scanning from the left to the right returns to the left again. At this time, irradiation of laser beam is in a stopped state.

In addition, referring to a scanning waveform 33, the left end of the scanning waveform 33 goes down rapidly, then goes up gently toward the right, and then, goes down rapidly again. Among them, a waveform portion going up gently toward the right indicates that scanning is carried out while the laser beam is irradiated. Then, the waveform going down rapidly at both ends indicates a retrace area, and indicates that scanning from the top to the bottom returns to the top again. At this time, irradiation of the laser beam is in a stopped state.

The appearances of the scanning waveforms 30 and 31 are identical to those of the scanning waveforms 32 and 33, respectively.

At this time, for example, when irradiation of the laser beam in the second scanning optical system is not carried out, i.e., at a retrace area at which the horizontal scanning in the second scanning horizontal system is carried out, the scanning in the first scanning optical system is carried out, whereby the laser beam from the first scanning optical system and the laser beam from the second scanning optical system overlap do not each other at one point in a scanning region.

Figure 14:
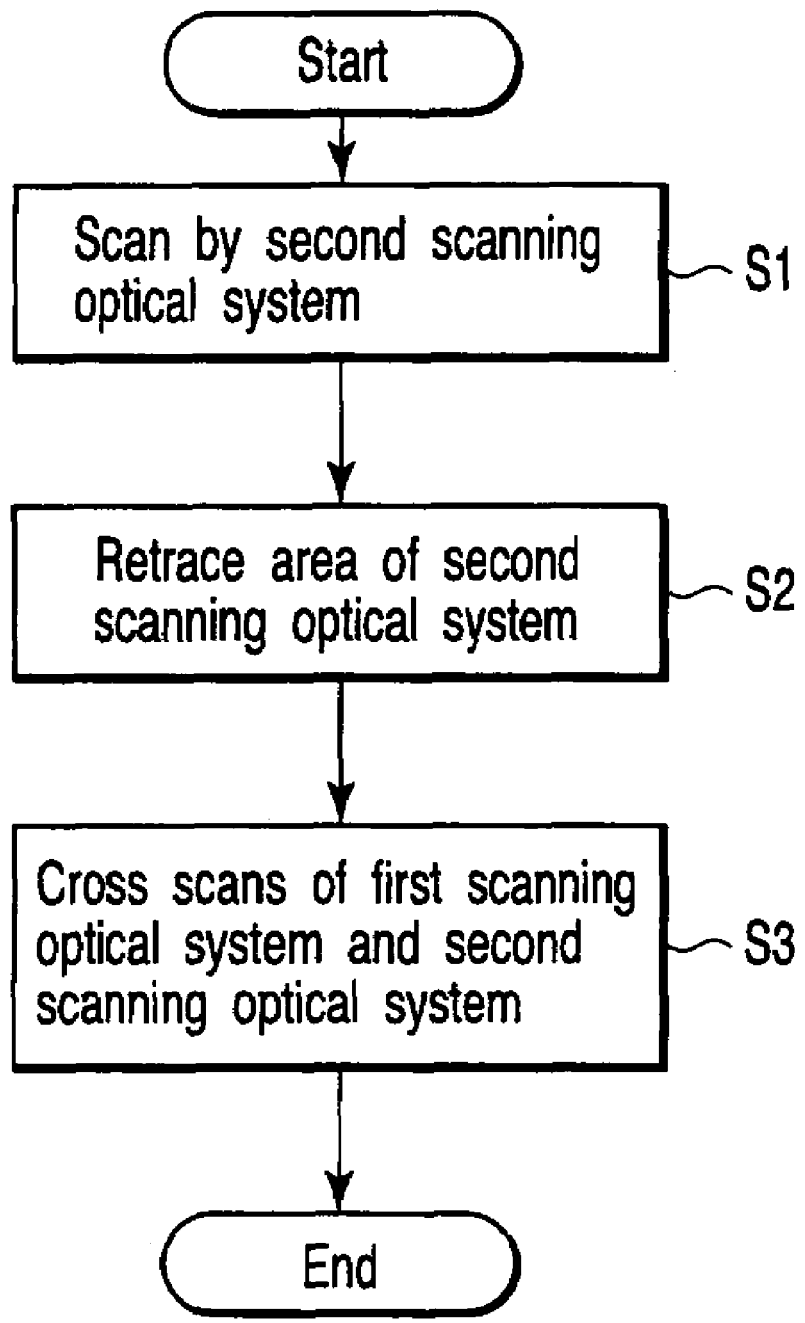
FIG. 14 is a view showing a flow of carrying out scanning of a first scanning optical system at a retrace area of a second scanning optical system in accordance with the eighth embodiment.

FIG. 14 shows a flow of carrying out scanning of the first scanning optical system at a retrace area of the second scanning optical system in accordance with the present embodiment. First, horizontal scanning is carried out in the scanning region 35 by means of the second scanning optical system (S1). Then, after the horizontal scanning terminates, a retrace area at which processing moves to next scanning start is established (S2). At this retrace area of the second scanning optical system, the first scanning optical system is scanned (S3), whereby the laser beam from the first scanning optical system and the laser beam from the second scanning optical system do not overlap each other at one point in a scanning region. Hereinafter, a method for achieving this will be described in detail.

A description will be given with respect to an example in which scans of two scanning optical systems cross each other at an end point of a retrace area in horizontal scanning of the second scanning optical system. In the formulas described hereinafter, INT ( ) denotes truncation.

First, a time T1, which elapses before scanning of the first scanning optical system reaches the beginning of a scan line of a start position (vertical position is yo2) of scanning in the second scanning optical system, is calculated in accordance with formula (1) below.

$$T1 = Lx1 \times (yo2-1) \times C1 \tag{1}$$

Next, a scan time T2 at one horizontal scan in the second scanning optical system is calculated in accordance with formula (2) below.

$$T2 = Lx2 \times C2 \tag{2}$$

From the above T1 and T2, a count "na" of which the second scanning optical system carries out horizontal scanning until the scanning of the first scanning optical system reaches the start position of the scanning in the second scanning optical system is calculated in accordance with formula (3) below.

$$na = INT(T1/T2) \tag{3}$$

From the foregoing, when the scanning in the first scanning optical system has reached the start position of the scanning in the second scanning optical system, a vertical position Ys2 of the scanning in the second scanning optical system can be calculated in accordance with formula (4) below.

$$Ys2 = na - [INT(na/Ly2) \times Ly2] \tag{4}$$

Here, assume that scans in the two scanning optical systems cross each other at an end point of the retrace area of the horizontal scanning at the vertical position Ys2 of the scanning in the second scanning optical system.

Then, a time Ta which elapses before the scanning in the second scanning optical system reaches the vertical position Ys2 of the scanning in the second scanning optical system is calculated in accordance with formula (5) below.

$$Ta = Ys2 \times T2 \tag{5}$$

Next, a vertical position Ys1 reached by the scanning in the first scanning optical system within the above time Ta is calculated by formula (6)

$$Ys1 = IN(Ta/Lx1 \times C1) \tag{6}$$

Then, a difference Ds in vertical positions reached by scanning of each of the scanning optical systems in the time Ta is calculated in accordance with formula (7).

$$Ds = (yo2 + Ys2) - Ys1 \tag{7}$$

From the foregoing, the scanning start time of the second scanning optical system may be delayed by a time component of this difference in vertical positions with respect to the scanning start time of the first scanning optical system. This delay time "t" can be calculated in accordance with formula (8) below.

$$t = [Ds \times Lx1 + xo2 + ((Lx1 - X1)/2)] \times C1 + C2 \tag{8}$$

From the foregoing, it becomes possible to eliminate influence of the laser beam between the scanning optical systems in measuring a change with time of an ion concentration distribution or in FRAP experimentation and the like when a specific phenomenon is generated in a desired region by using a plurality of scanning optical systems.

Ninth Embodiment

Figure 15:
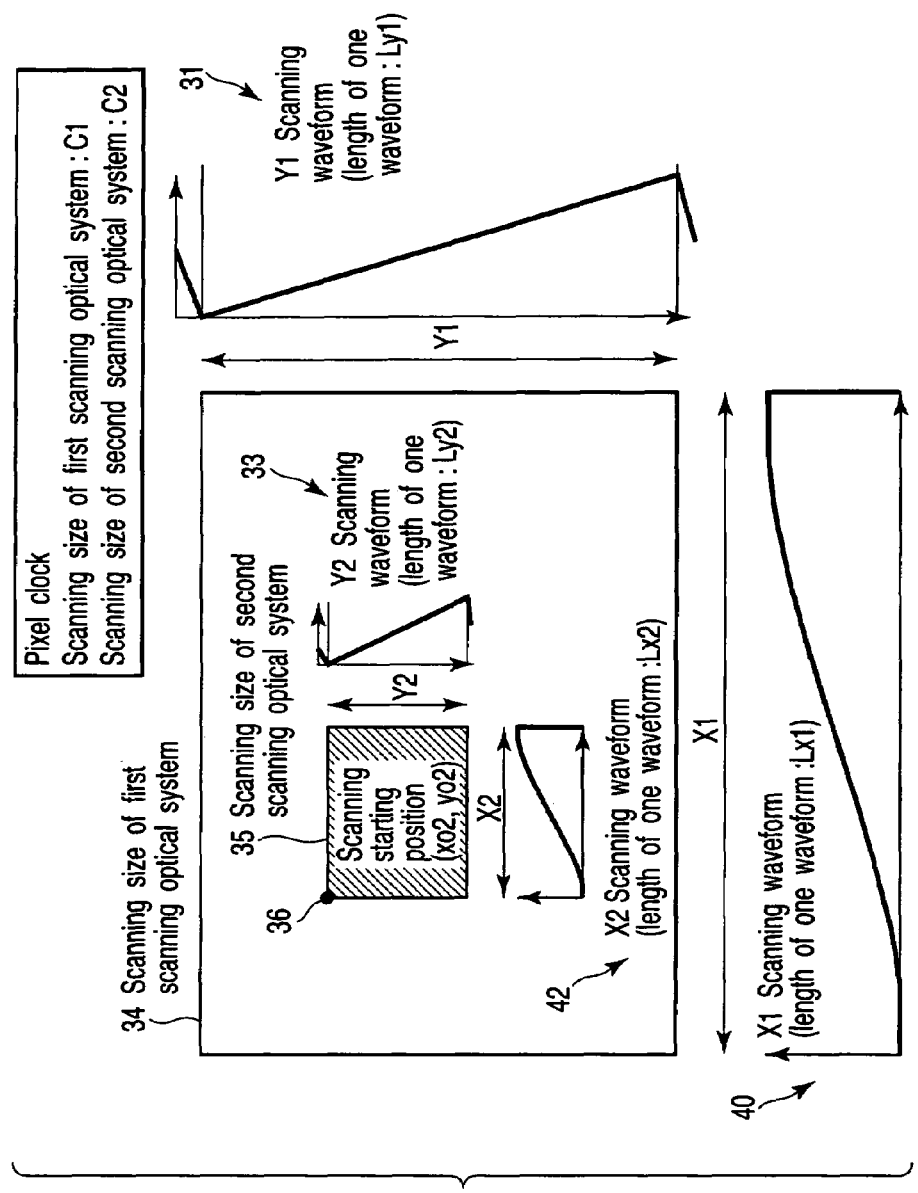
FIG. 15 is a view showing a relationship between a scanning waveform and a scanning operation in accordance with a ninth embodiment.

While the eighth embodiment has described that horizontal scanning is carried out in one direction from the left to the right of a scanning image, there is a case in which scanning is carried out in two directions from the left to the right and from the right to the left of the scanning image, i.e., in a reciprocal manner. This is a case in which a relationship between a scanning waveform and a scanning operation is established as shown in FIG. 15. In this case, the scanning in the first scanning optical system and the scanning in the second scanning optical system may cross each other at a retrace area of vertical scanning of the second scanning optical system.

FIG. 15 shows a relationship between a scanning waveform and a scanning operation in accordance with the present embodiment. In FIG. 15, a difference from FIG. 12 is that scanning waveforms 40 and 42 are changed in order to make reciprocal horizontal scans of the first scanning optical system and the second scanning optical system.

A description will be given with respect to the scanning waveform 40. First, at the time of scanning from the left to the right, the scanning waveform 40 reaches saturation while a gentle curve is depicted, and a waveform by inverting this waveform is obtained after loop-back (during scanning from the right to the left). This also applies to the scanning waveform 42.

In the present embodiment, the scanning in the first scanning optical system and the scanning in the second optical system are crossed with each other at a retrace area of vertical scanning in the second scanning optical system.

Hereinafter, a description will be given with respect to calculation of a delay time in the case where the scanning in the first scanning optical system and the scanning in the second scanning optical system are crossed at a retrace area of vertical scanning in the second scanning optical system. In the following description, INT ( ) in each formula denotes truncation.

First, a time Tr1, which elapses before the scanning in the first scanning optical system reaches an end position of one XY scan in the second scanning optical system, is calculated in accordance with formula (9) below.

$$Tr1 = [Lx1 \times (yo2 + Y2 - 1) + xo2 + X2 + (Lx1 - X1)/2] \times C1 \quad (9)$$

Next, a scan time Tr2 of one XY scan in the second scanning optical system is calculated in accordance with formula (10) below.

$$Tr2 = Lx2 \times Ly2 \times C2 \quad (10)$$

From the above Tr1 and Tr2, before the scanning in the first scanning optical system reaches an end position of the scanning in the second scanning optical system, a count "nr" of which the second scanning optical system carries out XY scanning is calculated in accordance with formula (11) below.

$$nr = INT(Tr1/Tr2) \quad (11)$$

From the foregoing, a time Tr, which elapses before an (nr+1)th scan in the second scanning optical system reaches an end position of the scanning in the second scanning optical system, is calculated in accordance with formula (12) below.

$$Tr = (nr+1) \times Tr2 \quad (12)$$

Then, a vertical position Yr1 reached by the scanning in the first scanning optical system in the above time Tr is calculated in accordance with formula (13) below.

$$Yr1 = INT(Tr/(Lx1 \times C1)) \quad (13)$$

Then, a difference Dr in vertical positions reached by the scanning of each scanning optical system in the time Tr is calculated in accordance with formula (14) below.

$$Dr = (yo2 + Y2) - Yr1 \quad (14)$$

From the foregoing, the scanning start time of the second scanning optical system may be delayed by a time component of this difference in vertical positions with respect to the scanning start time of the first scanning optical system. This delay time "tr" can be calculated in accordance with formula (15) below.

$$tr = [Dr \times Lx1 + xo2 + X2 + (Lx1 - X1)/2] \times C1 + C2 \quad (15)$$

As has been described above, it becomes possible, even in the case of reciprocal scan, to eliminate influence of the laser beam between the scanning optical systems in measuring a change with time in ion concentration distribution or in experimentation of FRAP when a specific phenomenon is generated in a desired region by using a plurality of scanning optical systems.

While the eighth and ninth embodiments have described that the scanning in the first scanning optical system and the scanning of the second scanning optical system are crossed at the beginning of a retrace area of the second scanning optical system, any position may be set as long as it is a retrace area of the second scanning optical system.

In addition, while the eighth and ninth embodiments have described a case in which the scanning region of the second scanning optical system is smaller than that of the first scanning optical system, in the case where the scanning region of the second scanning optical system is greater than that of the first scanning optical system, the scans in the two scanning optical systems cross each other at a retrace area of the scanning in the first scanning optical system.

While the eighth and ninth embodiments have described that the scanning start time of the second scanning optical system is delayed with respect to that of the first scanning optical system, the scanning start time of the first scanning optical system may be delayed with respect to that of the second scanning optical system.

The eighth embodiment has described that the horizontal scanning directions of the first scanning optical system and the second scanning optical system are unidirectional, respectively, and the ninth embodiment has described that the above directions are reciprocal, respectively. However, horizontal scanning may be carried out while one scanning optical system is unidirectional and the other scanning optical system is reciprocal without being limited thereto.

The eighth and ninth embodiments have described that the scanning directions in the scanning regions of the first and second scanning optical systems are identical to each other. For example, however, scanning in an opposite direction may be carried out such that one scanning optical system is caused to carry out scanning from the left and the other is caused to carry out scanning from the right. By doing this, a crossing time is reduced, and a burden required for control is reduced.

While the seventh to ninth embodiments have described that two scanning optical systems are used, more than two scanning optical systems may be used without being limited thereto. For example, in the case where five scanning optical systems are present, four regions can be photo-bleached at the same time by using one as an image acquisition scanning optical system and the other four as photo bleaching scanning optical systems. In this manner, FRAP experiment can be carried out under a variety of pattern conditions.

According to the present invention, an observation image can be acquired without being affected by other excitation light or stimulation light of the above and below microscopes.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A laser scanning microscope comprising:
a first laser scanning optical system which is operable to irradiate coherent excitation light for exciting fluorescence and to scan a sample with the excitation light, from a first side of the sample;
a second laser scanning optical system which is operable to irradiate coherent stimulation light for giving optical stimulation to the sample and to scan the sample with the stimulation light, from a second side of the sample that is opposite to the first side of the sample;
an observation light detector which is provided on a path branched from the first laser scanning optical system, and which receives the fluorescence which has been generated from the sample by irradiation of the excitation light and which has returned to the first laser scanning optical system; and
a light invasion preventing section which prevents the stimulation light from invading the observation light detector;
wherein the light invasion preventing section comprises a control section which stops laser irradiation of the stimulation light by the second laser scanning optical system while continuing the irradiation of the excitation light by the first laser scanning optical system when the first laser scanning optical system scans, with the excitation light, a region in which an observation scanning area to be scanned with the excitation light by the first laser scanning optical system and a stimulation scanning area to be scanned with the stimulation light by the second laser scanning optical system overlap each other, and wherein the control section performs control to resume irradiation of the stimulation light to the sample by the second laser scanning optical system when the first laser scanning optical system scans, with the excitation light, a region within the observation area that does not overlap the stimulation scanning area.

2. A laser scanning microscope comprising:
a first laser scanning optical system which is operable to irradiate coherent excitation light for exciting fluorescence and to scan a sample with the excitation light;
a second laser scanning optical system which is operable to irradiate coherent stimulation light for giving optical stimulation to the sample and to scan the sample with the stimulation light;
an observation light detector which is provided on a path branched from the first laser scanning optical system, and which receives the fluorescence which has been generated from the sample by irradiation of the excitation light and which has returned to the first laser scanning optical system; and
a light invasion preventing section which prevents the stimulation light from invading the observation light detector, wherein the light invasion preventing section: (i) stops laser irradiation of the stimulation light by the second laser scanning optical system while continuing the irradiation of the excitation light by the first laser scanning optical system when the first laser scanning optical system scans, with the excitation light, a region in which an observation scanning area to be scanned with the excitation light by the first laser scanning optical system and a stimulation scanning area to be scanned with the stimulation light by the second laser scanning optical system overlap each other, and (ii) resumes irradiation of the stimulation light to the sample by the second laser scanning optical system when the first laser scanning optical system scans, with the excitation light, a region within the observation scanning area that does not overlap the stimulation scanning area.

3. A laser scanning microscope comprising:
a first laser scanning optical system which is operable to irradiate coherent excitation light for exciting fluorescence and to scan an observation scanning area of a sample with the excitation light;
a second laser scanning optical system which is operable to irradiate coherent stimulation light for giving optical stimulation to the sample and to scan a stimulation scanning area of the sample with the stimulation light;
an observation light detector which is provided on a path branched from the first laser scanning optical system, and which receives the fluorescence which has been generated from the sample by irradiating the excitation light and which has returned to the first laser scanning optical system; and
a light invasion preventing section which prevents the stimulation light from invading the observation light detector, wherein the light invasion preventing section: (i) stops laser irradiation of the stimulation light by the second laser scanning optical system while continuing the irradiation of the excitation light by the first laser scanning optical system when an irradiation point of the excitation light of the first laser scanning optical system and an irradiation point of the stimulation light of the second laser scanning optical system coincide with each other, if the observation scanning area is to be scanned, with the excitation light, by the first laser scanning optical system simultaneously with the scanning of the stimulation scanning area, with the stimulation light, by the second laser scanning optical system, and (ii) resumes irradiation of the stimulation light to the sample by the second laser scanning optical while continuing the irradiation of the excitation light by the first laser scanning optical system when the irradiation point of the excitation light does not coincide with the irradiation point of the stimulation light.

* * * * *